United States Patent Office 2,822,312
Patented Feb. 4, 1958

2,822,312

MICROBICIDAL COMPOSITION MATERIAL IMPREGNATED THEREWITH AND METHOD OF IMPREGNATION

Ernst Bretscher, Basel, and Hans Hemmi, Binningen, Switzerland, assignors, by mesne assignments, to Saul & Co., Newark, N. J., as nominee of Fidelity Union Trust Company, executive trustee under Sandoz Trust No Drawing. Application May 4, 1953
Serial No. 352,972

Claims priority, application Switzerland May 7, 1952

7 Claims. (Cl. 167—30)

Textile materials, such as fibers, spun products, fabric and other flat or built-up articles, especially those of natural or regenerated cellulose, animal hides, wood, etc., have heretofore been protected against atack by micro-organisms, such as fungi and bacteria, by treatment with organic mercury compounds of the formula

wherein R represents a mononuclear aromatic radical and X stands for an anionic radical. These compounds are generally bound up with the disadvantage that the protection afforded thereby is not very fast to wet treatments, i. e. the articles treated therewith lose to a far-reaching extent their protection against attack by micro-organisms, if they are sprinkled or rinsed with aqueous liquids or if they are subjected to washing with water, particularly in the presence of alkaline agents. Efforts have been made to eliminate this disadvantage by using certain superior phenyl mercury compounds, e. g. phenyl mercury salts of diarylmethanesulfonic acids or phenyl mercury triethanolammonium salts. Articles impregnated with these reagents have an enhanced stability toward the sprinkling or rinsing action of water; however, they lose their microbicidal activity very rapidly when subjected to any washing treatment.

A primary purpose of the present invention is to obviate the afore-outlined deficiencies of the prior art. This is realized, according to the invention, by subjecting the materials which have been protected against attack by micro-organisms with the aid of an organic mercury compound of the aforesaid formula R—Hg—X to a treatment for fixing the fastness thereof to wet treatments, such fixing treatment involving treating the said materials with an aqueous solution or dispersion containing, as essential constituent, a water-soluble, basic polymeric, organic nitrogen compound which is capable of forming complex compounds with organo-inorganically bound mercury. This constituent which comprises also the water-soluble salts of these nitrogen compounds is hereinafter referred to as "fixing component."

The supplemental treatment with a fixing component according to the present invention can be carried out prior to, simultaneously with, or subsequently to the impregnation with the aforesaid organic mercury compound.

According to a presently-preferred embodiment of the invention, a water-soluble preparation, which contains at least one of the cited microbicidal organic mercury compounds and at least one fixing component, is dissolved in a predominantly aqueous liquid, the resultant solution being then employed for treating the material to be protected. The said preparation or the said predominantly aqueous liquid containing the said preparation may also contain other constituents, such as hydrophobizing, solubility-enhancing, stabilizing, surface-active or particular pH-maintaining substances, in so far as these substances are compatible with the said water-soluble preparation, the fixing component and the other additional constituents (i. e. do not form insoluble or difficultly-soluble products therewith), and in so far as they do not prejudice the desired fastness to wet treatments of the microbicidal action. This preferred form of the invention in many cases also presents the advantage, in addition to the advantage of simplicity, of enhancing the water-solubility of the microbicidal, organic mercury compounds as a result of the intimate admixture therewith of one or more fixing components.

Instead of the water-soluble mixture of microbicidal, organic mercury compounds and at least one fixing component and, in some cases, further components, as described in the preceding paragraph, use may also be made of water-soluble products which result from the reaction of one or more microbicidal, organic mercury compounds of the aforesaid formula

with one or more fixing components, or of their chemical equivalent, for example the starting substances for the preparation thereof.

Illustrative of microbicidal aryl mercury compounds of the aforesaid formula

which may be used in carrying out the present invention are phenyl mercury hydroxide, phenyl mercury acetate, phenyl mercury formate, phenyl mercury lactate, phenyl mercury borate, m-tolyl mercury acetate, p-aminophenyl mercury acetate, p-aminophenyl mercury lactate, p-aminophenyl mercury sulfate, p-dimethylaminophenyl mercury lactate, p-hydroxyphenyl mercury chloride, p-diethylaminophenyl mercury chloride, p-diethylaminophenyl mercury acetate, and many others.

Illustrative of fixing components suitable for the purposes of the present invention are for example high molecular polyalkylenepolyamines which can be prepared by the reaction between alkyl halides, such as ethylene chloride, propylene chloride, glycerine-dichlorhydrin, epichlorhydrin, etc., with ammonia, ethylene diamine, propylene diamine or other polyamines, as such or in the form of their alkylation or peralkylation products, and, in the event they contain halogen atoms or other groups which react with amines, also their amination products. Other suitable fixing components are condensation products of polyalkylene amines, such as diethylenetriamine, triethylenetetramine, tetraethylenepentamine, etc., with cyanamide or dicyandiamide or other compounds which contain at least once the grouping.

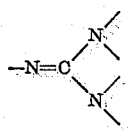

such for example as guanidine, biguanide, guanyl urea and aminoguanidine.

Use may also be made, as fixing components, of compounds obtained by condensing cyanamide or dicyandiamide or other compounds which contain at least once the grouping

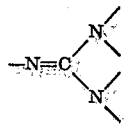

with aldehydes, especially formaldehyde, and ammonium or amine salts.

More specific illustrations of fixing agents and the method of preparing the same are set forth in the following examples. In these examples, percentages are by weight unless otherwise indicated. Parts by weight bear the same relationship to parts by volume as do grams to milliliters. The temperatures are in degrees centigrade.

EXAMPLE A 9 parts by weight of dicyandiamide together with 9 parts by weight of ammonium chloride in 18 parts by volume of distilled water are heated under reflux with 22 parts by volume of formaldehyde (37.5%) until complete dissolution has taken place. The temperature is then raised to 90–94°, and the entire mass is boiled under reflux for 28 minutes. The solution is evaporated under reduced pressure at a bath temperature of 60–65°. A brittle, glassy mass, which is of good water-solubility and which can be easily ground, is obtained.

EXAMPLE B 115 parts by weight of dicyandiamide are heated with 72 parts by volume of water and 27 parts by volume of hydrochloric acid (36.5%), while stirring gently. A distinct reaction takes place at 99–102°; upon completion of the reaction 27 parts by volume of the said hydrochloric acid are again added, whereupon a second reaction is initiated. Upon completion of this second reaction, 127 parts by volume of formaldehyde (37.5%; $d=1.08$) are added gradually in such manner that the reaction, which takes place with violent boiling, remains under control. Starting from the beginning of the reaction, the mixture is maintained boiling for 22 minutes, after which it is evaporated to dryness. There is thus obtained a white solid mass, which dissolves readily in water.

EXAMPLE C 41.3 parts by weight of glycerine-dichlorhydrin are gradually added to 70 parts by volume of aqueous ammonia solution of 24% strength. The temperature rises from 22° to about 70°. Upon completion of the reaction, which can be recognized by the drop in temperature of the reaction mass, the latter is again heated to boiling and maintained at boiling temperature, under reflux, for 4 hours. 44 parts by weight of the polyamine hydrochloride thus obtained are heated to 90° for 1 hour with 7.2 parts by weight of dicyandiamide or the equivalent quantity of cyanamide and 25 parts by volume of formaldehyde (37.5%; $d=1.08$). The resultant aqueous product is evaporated to dryness under reduced pressure. A white mass, which is soluble in water and can be easily ground, is obtained.

EXAMPLE D

The calcium cyanamide is extracted from 28.8 parts by weight of "lime-nitrogen" (crude calcium cyanamide) by means of 140 parts by volume of water at 45° in the course of 45 minutes. After filtration and washing, 4.70 parts by volume of concentrated sulfuric acid are added. The calcium sulfate is filtered off, washed, and the pH adjusted to 7.2 with the aid of aqueous sodium hydroxide solution (38° Bé.). 16.2 parts by volume of formaldehyde (40% by volume) are adjusted to a pH of 7 by means of aqueous caustic soda solution, after which the afore-prepared cyanamide solution is added. After standing for 16 hours, the resultant yellowish precipitate is filtered off with suction and dried. The product is soluble in dilute acids.

EXAMPLE E 53 parts by weight of diethylenetriamine are slowly heated, while stirring, with 39 parts by weight of dicyandiamide or a corresponding quantity of dry cyanamide, until ammonia begins to split off. Thereupon the temperature is raised to 135° and finally to 155–160°, the latter temperature being maintained for 5 hours. A very viscous melt is obtained which, upon solidification, yields a basic product which is capable of being ground. 50 parts by weight of the said product are carefully dissolved in 400 parts by volume of water, and the solution neutralized to a pH of 7.0 with the aid of sulfuric acid of 50% strength, while maintaining a maximum temperature of 60°. The neutralized solution is then evaporated to dryness under reduced pressure.

EXAMPLE F 23 parts by weight of epichlorhydrin are added dropwise in the course of about 5 hours to a solution, cooled to $-2°$, of 64 parts by weight of diethylenetriamine in 200 parts by volume of water. Thereupon, during the course of 5 more hours, the temperature is gradually raised to 20–25°. The resultant product is gradually introduced, in the course of 2½ to 3 hours, into 680 parts by volume of aqueous ammonia solution of 24% strength, which has been further diluted with 60 parts by volume of water, care being taken that the temperature does not exceed 35°. The mixture is then stirred for 10 hours. The reaction mass is gradually heated to boiling and evaporated down to 60% of its weight. The viscous mass is filtered through fuller's earth, and is then evaporated to dryness. A yellowish-brown mass, which can be pulverized, is obtained.

The following examples set forth representative embodiments of the invention involving combinations of microbicidal mercury compounds and fixing components. In these examples, the parts and percentages are by weight, unless otherwise indicated. The relationship between parts by weight and parts by volume is the same as that between grams and milliliters. Temperatures are in degrees centigrade.

*Example 1*

8.4 parts of phenyl mercury acetate and 91.6 parts of the condensation product prepared according to Example C are ground to finely powdered form. Cotton fabric which has been treated for 15 minutes at 60° with a 0.5% solution of the said powder in aqueous ammonia solution of 0.4% strength, followed by wringing out down to 100% moisture content and then drying, exhibits, in comparison with untreated fabric, a greatly increased resistance to attack by mold fungus, even when, after the treatment, it is rinsed out in running water or is washed with soap and soda at elevated temperature.

The fabric may be similarly protected by carrying out the impregnation first with 100%, relative to the weight of the fiber, of a 0.045% aqueous solution of phenyl mercury acetate, followed by an aftertreatment for 20 minutes at 60° with a 0.45% aqueous solution of the said condensation product, and then by a drying of the fabric. A fabric which has not been subjected to this aftertreatment shows an equivalent anti-mold action only if, after treatment with phenyl mercury acetate, it is not exposed to any rinse with water or to any washing treatment.

*Example 2*

A finely ground mixture of 8.5 parts of p-aminophenyl mercury acetate and 91.5 parts of the condensation product obtained according to Example C, is dissolved in 20,000 parts of water. Cotton fabric, sprayed with this solution until it has taken up 100% (relative to its own weight) of liquid, exhibits the same anti-mold action as does the fabric treated according to Example 1.

*Example 3*

Hemp yarn is treated for 20 minutes on a yarn dyeing machine with an aqueous solution, heated to 60°, and obtained by the addition to an 0.04% aqueous ammonia solution of 5 grams per liter of a homogeneous powder mixture consisting of 8.4% of phenyl mercury acetate and 91.6% of condensation product prepared according to Example A.

After drying, the yarn has a resistance toward the action of micro-organisms which can be expressed in the so-called soil burial test, as follows:

A sample of untreated yarn which has been held for 72 hours in running water is buried in compost soil. A sample of yarn which has been treated, dried and then kept for 72 hours in running water, is also buried in compost soil. The tensile strength of yarns from these test specimens is periodically determined. At the end of 4 weeks, the tensile strength of the untreated yarn will have dropped down to 10% of its original value, while at the end of 10 weeks the treated sample still has its undiminished tensile strength.

*Example 4*

91.5 parts of condensation product obtained according to Example A are ground together with 8.5 parts of p-aminophenyl mercury acetate into the form of a homogeneous mixture. Thereupon 0.5 part of this mixture is dissolved in 100 parts of water which, by the addition of ammonia, has been adjusted to a pH of 9. Cotton fabric is impregnated with the resultant solution in such manner that its weight increases 100%; after drying, the fabric exhibits a resistance to micro-organims corresponding to that realized according to Example 1.

*Example 5*

Cotton fabric, which has been impregnated up to 100% of its own weight with a weakly ammoniacal aqueous solution containing 0.042% of phenyl mercury acetate and 0.46% of the condensation product obtained according to Example F, exhibits after drying the same resistance to attack by mold fungus, as does the fabric treated according to Example 1.

*Example 6*

A lactic acid-containing solution of (N-diethyl-p-aminophenyl) mercury lactate with a mercury content of 8.0% is obtained by reacting 43.4 parts of yellow mercury oxide with 212.3 parts of 80% lactic acid in 200 parts of water, filtering, and then reacting with 30.8 parts of N-diethylaniline for 4 to 5 hours at room temperature (20–30°). 10.3 parts of the so-obtained solution and 0.75 part of the condensation product obtained according to Example A are dissolved in sufficient water to yield 3000 parts by volume of solution. The resultant liquid, after adjustment thereof to a pH of 5.5–6.5 with the aid of a small quantity of ammonia, is utilized as a bath for the treatment of cotton fabric at 60° for 15 minutes. The fabric, after having been pressed down to a 100% moisture content and dried, exhibits a resistance to attack by mold, similar to that realized according to Example 1.

*Example 7*

The treatment of cotton fabric described in Example 6 is carried out with similar effect with a solution prepared as follows: 3.17 parts of a finely ground powder mixture of 29 parts of (N-diethyl-p-aminophenyl)-mercury acetate and 71 parts of the condensation product obtained according to Example A, are stirred with 1.8 parts of 80% lactic acid, and the mixture then dissolved in sufficient water to yield 1800 parts by volume of solution. With the aid of a small quantity of ammonia, the pH of the solution is adjusted to 6–7.

*Example 8*

Instead of the powder mixture used in Example 1, use may be made with equal success of a powder mixture consisting of 8.5 parts of p-aminophenyl mercury acetate and 91.5 parts of condensation product prepared according to Example C.

*Example 9*

A homogeneous powder mixture, consisting of 12.4 parts of phenyl mercury acetate, 76.3 parts of neutral condensation product obtained according to Example E and 11.3 parts of basic condensation product obtained according to Example E, is dissolved in water to form a solution of 0.5% strength, which is then applied to cotton after the manner described in Example 1 in connection with another powder mixture. The resistance of the fabric to attack by mold fungus is enhanced in similar degree.

*Example 10*

5 parts of condensation product prepared according to Example D are stirred with the same quantity of 80% lactic acid, then heated up with 30 parts of water and, finally, sufficient water added to bring the solution up to 1000 parts. 150 parts of the resultant solution are diluted with 2000 parts of water, after which 9.3 parts of the lactic acid-containing solution of (N-diethyl-p-aminophenyl)-mercury lactate described in Example 6 are added, and the product diluted with water to yield 3000 parts of solution. The latter is adjusted to a pH of 5.5–6.5 with the aid of a small quantity of ammonia, and is then used for treating cotton yarn. The treated material is thereupon subjected to the soil burial test as described in Example 3. The results are essentially comparable, as regards treated and untreated yarn, with the results described in Example 3.

*Example 11*

14 parts of a homogeneous powder mixture consisting of 37 parts of (N-diethyl-p-aminophenyl)-mercury acetate, 45 parts of anhydrous citric acid and 18 parts of condensation product obtained according to Example D, are dissolved in 10,000 parts of water, adjusted to a pH of 5.5–6.5 by means of ammonia. The cotton fabric is treated with this solution after the manner described in Example 1, whereby it achieves a resistance to mold fungus similar to that achieved by the fabric described in Example 1.

*Example 12*

A finely ground mixture of 11.1 parts of technical (N-diethyl-p-aminophenyl)-mercury citrate having a mercury content of 45.0%, 82.7 parts of anhydrous citric acid and 6.2 parts of condensation product obtained according to Example D, are dissolved in water to produce a 0.5% solution, the pH of which is adjusted to 4 by means of a small quantity of ammonia. Cotton fabric treated with this solution after the manner described in Example 1 shows a resistance to attack by mold which is essentially the same as that exhibited by the fabric treated according to the said example.

The technical (N - diethyl - p - aminophenyl) - mercury citrate, used in the present example, may be obtained in the following manner:

46.0 parts of 92% citric acid are dissolved in 420 parts of water, after which 43.3 parts of mercury oxide are added. After stirring for half an hour, 59.2 parts of freshly distilled N-diethylaniline are added. The mixture is stirred overnight, after which the resultant white precipitate is filtered off with suction, washed with water and dried at 70° under reduced pressure. There are thus obtained 80 parts of technically pure product melting at 138–142° (with decomposition) and having a mercury content of 45.0%.

*Example 13*

170 parts of aqueous formaldehyde solution (36.5%) are adjusted to a pH of 7.5 with concentrated aqueous caustic soda solution, after which 84 parts of dicyandiamide are added. The solution is vigorously stirred in a bath at 85–90° until a test specimen, after dilution with the 3-fold quantity of cold water, yields a distinct opalescence but does not give a precipitate. Thereupon the mixture is evaporated to dryness at a bath temperature of 70° under reduced pressure. A water-soluble solid mass, capable of being ground, is obtained. 50 parts of a homogeneous powder mixture, consisting of 45.8 parts of said mass and 4.2 parts of phenyl mercury acetate, are dissolved in 10,000 parts of water, and the solution used for treating hemp yarn after the manner described in Example 3. The resistance to attack by mold thereby achieved is similar to that realized according to Example 3.

*Example 14*

76 parts of an aqueous solution, of 43% strength, of 1,3-diamino-2-hydroxy-propane, obtained by the reaction between corresponding quantities of 1,3-dichlorhydrin and ammonia in water for 10 hours at 45°, are adjusted to a pH of 2.8 with concentrated hydrochloric acid, after which 19 parts of dicyandiamide and 54 parts of 36.5% formaldehyde are added. The solution is heated to 85° and maintained at this temperature for 20 minutes, while stirring, whereupon 5 parts of finely ground phenyl mercury acetate are added in small portions. After stirring for 40 minutes, traces of undissolved material are filtered off, and the filtrate is evaporated to dryness at 60–70° under reduced pressure. The residue can be readily ground into the form of a fine, orange-yellow, water-soluble powder which contains 4.2% of mercury. A 0.6% aqueous solution of this powder is used for the treatment of cotton fabric, after the manner described in Example 1. The resultant resistance against attack by mold fungus, which resistance is stable to water and to washing treatments, is similar to that achieved by the treatment according to Example 1.

*Example 15*

A solution of 19.8 parts of p-aminophenyl mercury acetate in 150 parts of diethylenetriamine is admixed with 119 parts of dicyandiamide and the mixture is stirred and heated to 150–155° until 40 parts of ammonia have been evolved, which should require about 4–5 hours. The resultant viscous melt solidifies, upon cooling, into the form of a pulverizable water-soluble mass. A 0.5% aqueous solution of the powder prepared from the said mass, adjusted with ammonia to a pH of 7.5–8.5 and employed for the treatment of cotton fabric after the manner set forth in Example 1, has the same fungicidal effect as the treatment according to Example 1.

Having thus disclosed the invention, what is claimed is:

1. A process for the production of microbicidally impregnated cellulose material which comprises impregnating said material with a microbicidal organic mercury compound of the formula $$R-Hg-X$$

wherein R represents a mononuclear aromatic radical and X represents an anionic radical, and with a fixing component forming a complex compound with said mercury compound and comprising the water-soluble polymeric condensation product of a polyalkylenepolyamine with a member selected from the group consisting of cyanamide and dicyandiamide, to form a fixed microbicide upon said material.

2. The process of claim 1 which the cellulose material is impregnated with the mercury compound and the fixing component therefor in admixture in aqueous solution.

3. A process for the production of microbicidally impregnated cellulose material which comprises impregnating said material with a microbicidal organic mercury compound of the formula $$R-Hg-X$$

wherein R represents a mononuclear aromatic radical and X represents an anionic radical, and with a fixing component forming a complex compound with said mercury compound and comprising the water-soluble polymeric condensation product of diethylenetriamine and dicyandiamide, to form a fixed microbicide upon said fibrous material.

4. Cellulose material impregnated with a fixed microbicide comprising the reaction product of a microbicidal organic mercury compound of the formula $$R-Hg-X$$

wherein R represents a mononuclear aromatic radical and X represents an anionic radical, and a fixing component therefor comprising the water-soluble polymeric condensation product of a polyalkylenepolyamine and a member selected from the group consisting of cyanamide and dicyandiamide.

5. A microbicidal composition for application to cellulose material comprising a mixture of a microbicidal organic mercury compound of the formula $$R-Hg-X$$

wherein R represents a mononuclear aromatic radical and X represents an anionic radical, and a fixing component for said mercury compound comprising the water-soluble polymeric condensation product of a polyalkylenepolyamine and a member selected from the group consisting of cyanamide and dicyandiamide.

6. A process for the production of microbicidally impregnated cellulose material which comprises impregnating said material with phenyl mercury acetate, as microbicidal organic mercury compound, and with a fixing component forming a complex compound with the latter and comprising the water-soluble polymeric condensation product of diethylenetriamine and dicyandiamide, to form a fixed microbicide upon said material.

7. Cellulose material impregnated with a fixed microbicide comprising the complex reaction product of phenyl mercury acetate, as microbicidal organic mercury compound, and a fixing component therefor comprising the water-soluble polymeric condensation product of diethylenetriamine and dicyandiamide.

References Cited in the file of this patent

UNITED STATES PATENTS

| | | |
|---|---|---|
| 2,446,864 | Abrams | Aug. 10, 1948 |
| 2,479,275 | Sowa | Aug. 16, 1949 |
| 2,515,107 | Amick | July 11, 1950 |
| 2,637,661 | Benignus | May 5, 1953 |